United States Patent
Drummond et al.

(10) Patent No.: US 11,924,153 B2
(45) Date of Patent: Mar. 5, 2024

(54) MESSAGING USER INTERFACE ELEMENT WITH REMINDERS

(71) Applicant: Snap Inc., Santa Monica, CA (US)

(72) Inventors: Virginia Drummond, Venice, CA (US); Celia Nicole Mourkogiannis, Los Angeles, CA (US)

(73) Assignee: SNAP INC., Santa Monica, CA (US)

(*) Notice: Subject to any disclaimer, the term of this patent is extended or adjusted under 35 U.S.C. 154(b) by 0 days.

(21) Appl. No.: 17/646,674

(22) Filed: Dec. 30, 2021

(65) Prior Publication Data
US 2022/0210107 A1    Jun. 30, 2022

Related U.S. Application Data

(60) Provisional application No. 63/133,187, filed on Dec. 31, 2020.

(51) Int. Cl.
| | | |
|---|---|---|
| *G06F 3/04842* | (2022.01) | |
| *G06F 3/01* | (2006.01) | |
| *G06F 3/0481* | (2022.01) | |
| *G06F 40/20* | (2020.01) | |
| *H04L 51/216* | (2022.01) | |

(52) U.S. Cl.
CPC ............ *H04L 51/216* (2022.05); *G06F 3/011* (2013.01); *G06F 3/0481* (2013.01); *G06F 3/04842* (2013.01); *G06F 40/20* (2020.01); *G06F 2203/011* (2013.01)

(58) Field of Classification Search
CPC .... G06F 3/0481; G06F 3/04842; G06F 40/20; G06F 3/011; G06F 2203/011; H04L 51/216
See application file for complete search history.

(56) References Cited

U.S. PATENT DOCUMENTS

| | | | | |
|---|---|---|---|---|
| 6,727,916 | B1* | 4/2004 | Ballard | G06Q 10/107 715/758 |
| 7,908,554 | B1* | 3/2011 | Blattner | H04L 51/043 715/706 |
| 8,375,309 | B2* | 2/2013 | Fioretti | G06Q 10/10 715/753 |
| 8,719,280 | B1* | 5/2014 | Paglia | G06F 16/9535 715/753 |
| 9,990,610 | B2* | 6/2018 | Agarwal | G06F 40/169 |
| 10,509,531 | B2* | 12/2019 | Sharifi | G06F 40/10 |
| 2005/0289470 | A1* | 12/2005 | Pabla | G06F 9/4451 715/755 |
| 2007/0293206 | A1* | 12/2007 | Lund | H04M 7/0027 455/415 |
| 2008/0082613 | A1* | 4/2008 | Szeto | G06Q 10/107 709/206 |
| 2008/0294741 | A1* | 11/2008 | Dos Santos | G06Q 10/107 709/206 |

(Continued)

*Primary Examiner* — Dino Kujundzic
(74) *Attorney, Agent, or Firm* — SCHWEGMAN LUNDBERG & WOESSNER, P.A.

(57) ABSTRACT

In one or more implementations, a messaging history between a first user and a second user may be analyzed to determine a context for a new messaging session between the first user and the second user. A reminder message to the at least one of the first user or the second user may be displayed in a messaging user interface element that replaces a default message. The reminder message may be related to a tone for the new messaging session.

20 Claims, 8 Drawing Sheets

(56) References Cited

U.S. PATENT DOCUMENTS

| | | | | |
|---|---|---|---|---|
| 2009/0063992 A1* | 3/2009 | Gandhi | G06Q 10/107 |
| | | | 715/752 |
| 2009/0106365 A1* | 4/2009 | Drory | H04L 51/234 |
| | | | 709/206 |
| 2009/0161845 A1* | 6/2009 | Adams | H04M 1/57 |
| | | | 379/93.23 |
| 2009/0300525 A1* | 12/2009 | Jolliff | H04M 1/72451 |
| | | | 715/764 |
| 2011/0264528 A1* | 10/2011 | Whale | H04L 67/025 |
| | | | 705/347 |
| 2014/0025371 A1* | 1/2014 | Min | G06F 3/04886 |
| | | | 704/9 |
| 2015/0113435 A1* | 4/2015 | Phillips | G06F 3/0488 |
| | | | 715/752 |
| 2015/0169832 A1* | 6/2015 | Davis | G06F 3/0346 |
| | | | 702/19 |
| 2015/0207765 A1* | 7/2015 | Brantingham | H04L 51/046 |
| | | | 715/758 |
| 2016/0037311 A1* | 2/2016 | Cho | G06Q 30/02 |
| | | | 455/466 |
| 2016/0062968 A1* | 3/2016 | Umapathy | G06Q 10/10 |
| | | | 715/752 |
| 2016/0171110 A1* | 6/2016 | Gao | G06F 16/29 |
| | | | 707/722 |
| 2016/0241500 A1* | 8/2016 | Bostick | H04L 51/10 |
| 2016/0337281 A1* | 11/2016 | Breedvelt-Schouten | |
| | | | H04L 51/04 |
| 2017/0351768 A1* | 12/2017 | Nagao | G06F 16/436 |
| 2018/0024991 A1* | 1/2018 | Baldwin | G06F 16/335 |
| | | | 704/9 |
| 2018/0089588 A1* | 3/2018 | Ravi | G06F 7/08 |
| 2018/0189628 A1* | 7/2018 | Kaufmann | H04L 51/56 |
| 2018/0212908 A1* | 7/2018 | Knudson | G06F 40/279 |
| 2018/0309706 A1* | 10/2018 | Kim | G10L 15/1815 |
| 2019/0124019 A1* | 4/2019 | Leon | H04L 51/02 |
| 2020/0134017 A1* | 4/2020 | Arar | G06F 40/35 |
| 2021/0368039 A1* | 11/2021 | Voss | H04N 21/4532 |

* cited by examiner

US 11,924,153 B2

MESSAGING USER INTERFACE ELEMENT WITH REMINDERS

CROSS-REFERENCE TO RELATED APPLICATION

This patent application claims the benefit of U.S. Provisional Patent Application No. 63/133,187, filed Dec. 31, 2020, entitled "MESSAGING USER INTERFACE ELEMENT WITH REMINDERS", which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, user content may be modified by augmented reality content and shared with one or more additional users.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
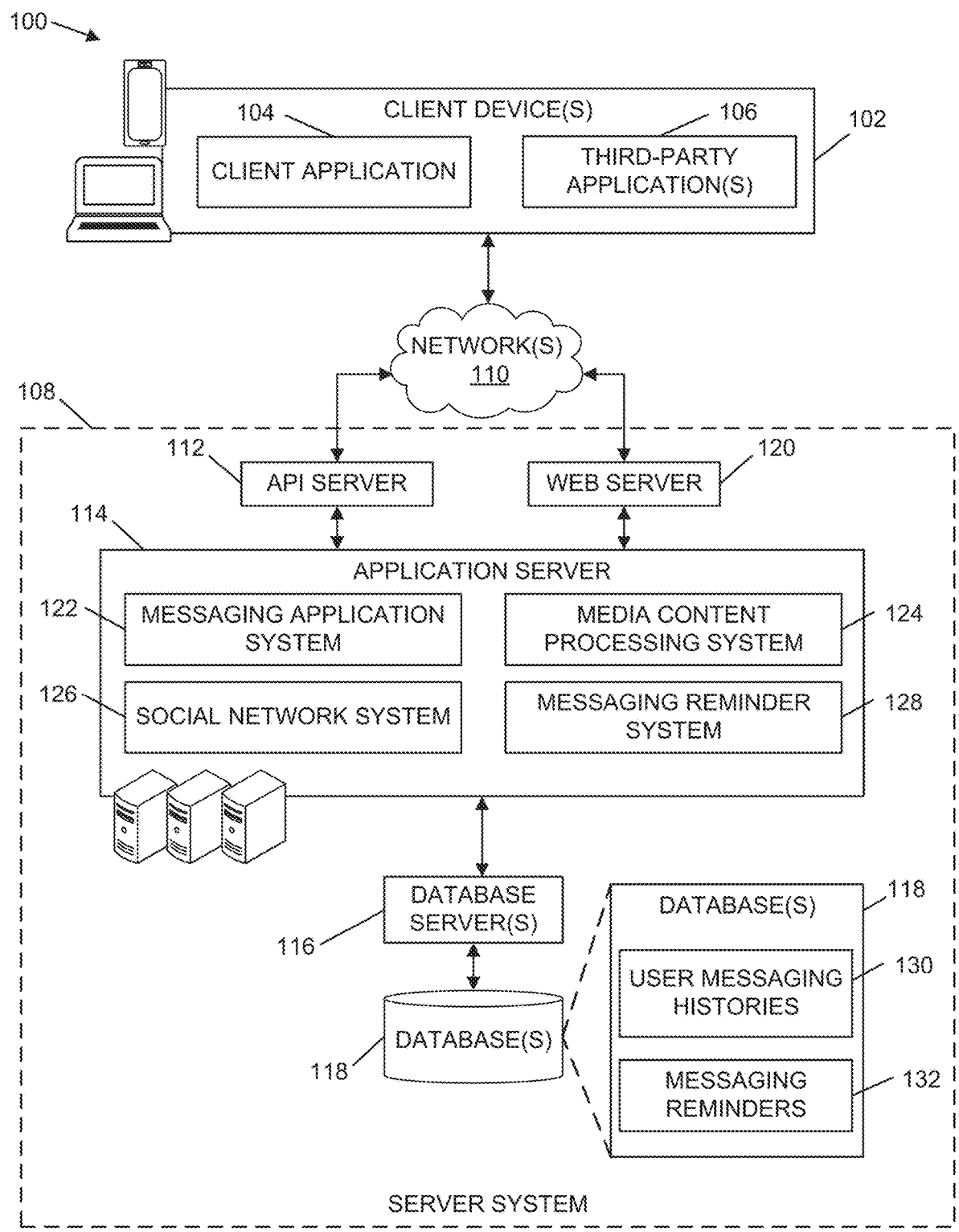
FIG. 1 is a diagrammatic representation of an architecture for exchanging data (e.g., messages and associated content) over a network, according to one or more example implementations.

The systems, methods, techniques, instruction sequences, and computing machine program products described herein are directed to displaying a reminder message to a participant in a messaging session based on a messaging history between participants in the messaging session. The reminder message may be displayed in a content capture user interface element (e.g., a chat box) that captures content to be included in a message of the messaging session. The reminder message may replace a default message that may be displayed within the content capture user interface element. In addition, the reminder message may be displayed prior to content being captured within the content capture user interface element. That is, the reminder message may be displayed in the content capture user interface element before a participant enters text or other content into the content capture user interface element. The reminder message may be displayed to help set the tone for the messaging session.

In one or more examples, a first user of a client application may initiate a messaging session with a second user of the client application. A messaging history between the first user and the second user may be analyzed to determine a context for the messaging session. In various examples, a frequency of communication between the first user and the second user may be determined. Additionally, a recency of communication between the first user and the second user may be determined. At least one of the frequency of communication or the recency of communication between the first user and the second user may be analyzed to determine whether to include a reminder message within the content capture user interface element. The content of messages included in the messaging history between the first user and the second user may also be analyzed to determine whether to include a reminder message in the content capture user interface element.

In response to determining that a reminder message is to be included in the content capture user interface element prior to a message being sent in the messaging session, a reminder message may be selected from a list of a plurality of reminder messages. In one or more examples, a reminder message may be selected based on a context of the messaging session based on the messaging history between the first user and the second user. In various examples, a number of contexts for messaging sessions may be designated and each context may be associated with a respective set of reminder messages. For example, a context corresponding to relatively infrequent messaging between the first user and the second user may be associated with a first set of reminder messages, Additionally, a context corresponding to a threshold amount of time passing since a last messaging session between the first user and the second user may be associated with a second set of reminder messages. After determining a reminder message that corresponds to the messaging history between the first user and the second user, the reminder message may be displayed in the content capture user interface element.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104.

In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, and a messaging reminder system 128. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The messaging reminder system 128 may determine that a messaging session is being initiated by a first user of the client application 104 and that at least a second user of the client application 104 is a recipient of the message. The messaging reminder system 128 may analyze a messaging history between the first user and the second user. The messaging history may be stored as part of user messaging histories 130. The user messaging histories 130 may correspond to messages exchanged between users of the client application 104 within a number of messaging sessions. In one or more examples, individual messages exchanged between users of the client application 104 may be stored within the user messaging histories. The user messaging histories 130 may indicate content of the messages exchanged between users of the client application. The user messaging histories 130 may also indicate respective times and dates when the messages are communicated. The user messaging histories 130 may also indicate each of the participants in respective messaging sessions.

In various examples, the messaging reminder system 128 may analyze the messaging history between the first user and the second user to determine a context of the messaging session. The context of the messaging session may indicate a frequency of communication between the first user and the second user. The context of the messaging session may also indicate a time and date of a most recently exchanged message between the first user and the second user. In various examples, the context may be one of a plurality of contexts that are available to the messaging reminder system 128. Each context of the plurality of contexts may have one or more criteria related to one or more characteristics of messaging sessions between participants.

The messaging reminder system 128 may determine values for the one or more characteristics of the messaging history of the first user and the second user. For example, the messaging reminder system 128 may determine a duration between a current time and a time and date that the last message exchanged between the first user and the second user was communicated. Additionally, the messaging reminder system 128 may determine a frequency of communication between the first user and the second user. The values of the one or more characteristics of the messaging history of the first user and the second user may be analyzed with respect to the criteria associated with one or more contexts of the plurality of contexts. The messaging reminder system 128 may determine the context of the messaging session between the first user and the second user based on a measure of similarity between the values of the one or more characteristics of the messaging history of the first user and the second user with respect to the one or more criteria of the context.

Based on the context of the messaging history between the first user and the second user, the messaging reminder system 128 may determine one or more messaging reminders to display to at least one of the first user or the second user during the messaging session. The messaging reminder may be selected from among the messaging reminders 132. A set of messaging reminders 132 may be associated with each context of a plurality of contexts. The messaging reminder system 128 may, based on the context of the messaging session between the first user and the second user, identify one of the messaging reminders 132 associated with that context. In situations where a messaging reminder 132 may be displayed multiple times during the messaging session, the messaging reminder system 128 may select a plurality of messaging reminders 132 related to the context from among the set of messaging reminders 132 related to the context. The messaging reminders may be displayed within a portion of a messaging user interface prior to at least one of the first user or the second user entering content to be exchanged during the messaging session.

Figure 2:
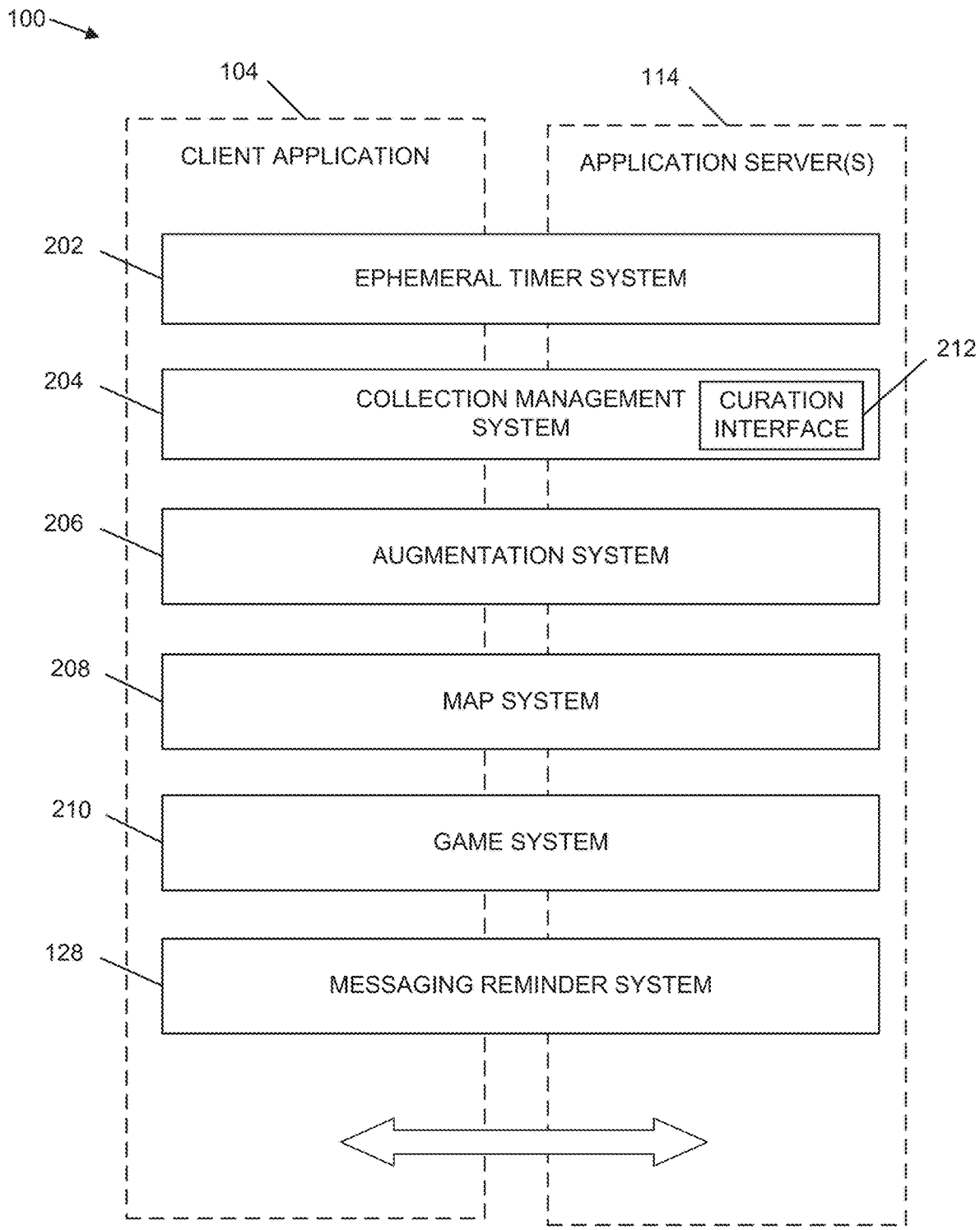
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, and the user locating AR content system 128.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The messaging reminder system 128 may determine a context for a messaging session between users of the client application 104 based on a messaging history between the users. The messaging reminder system 128 may also determine, based on the context, one or more reminder messages to provide to the participants in the messaging session prior to the messaging session, during the messaging session, or both.

Figure 3:
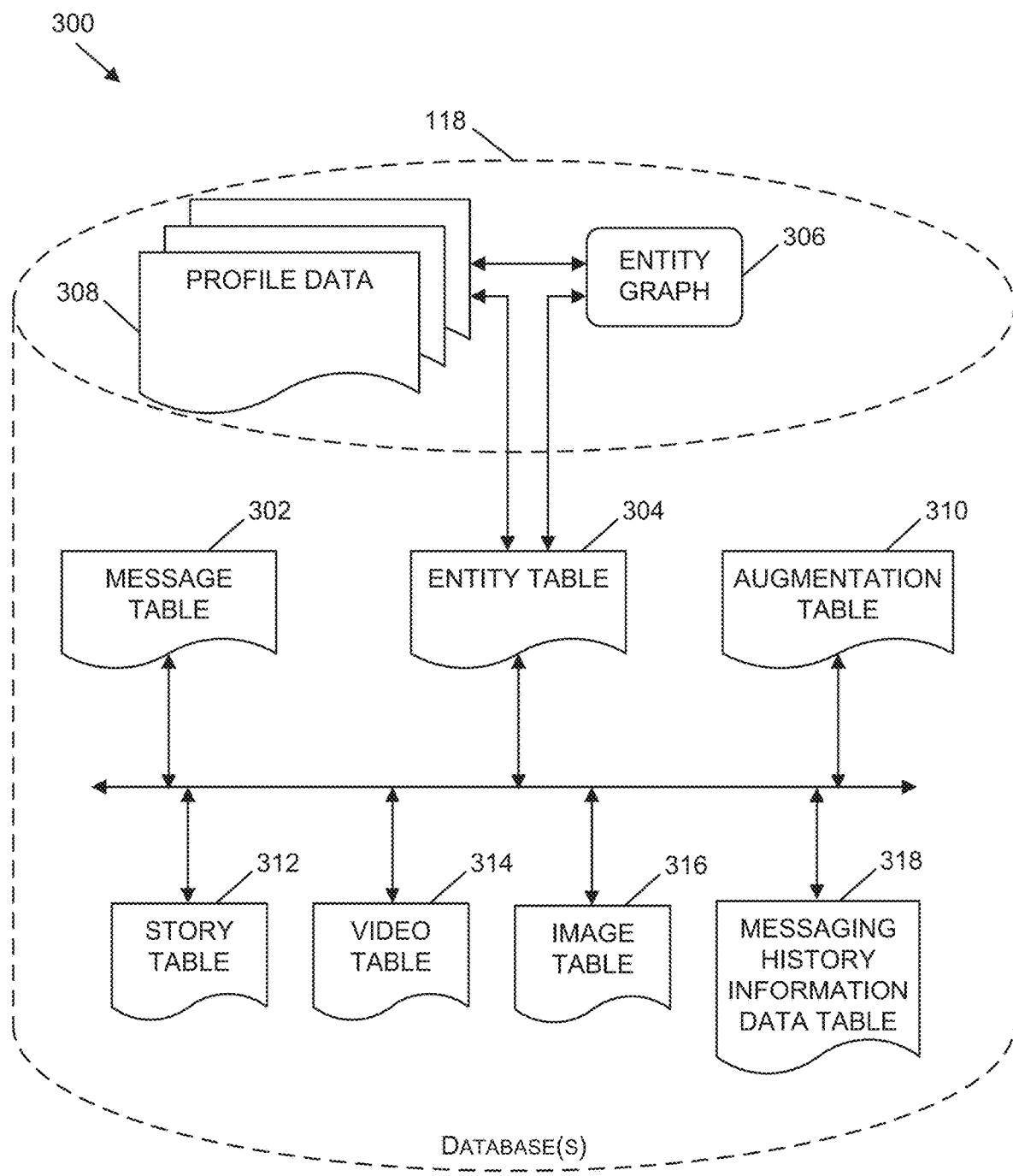
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a messaging history information data table 318. The messaging history information data table 318 may indicate a context of a messaging session between users of the client application 104. The messaging history information data table 318 may also indicate one or more reminder messages that are associated with each context.

Figure 4:
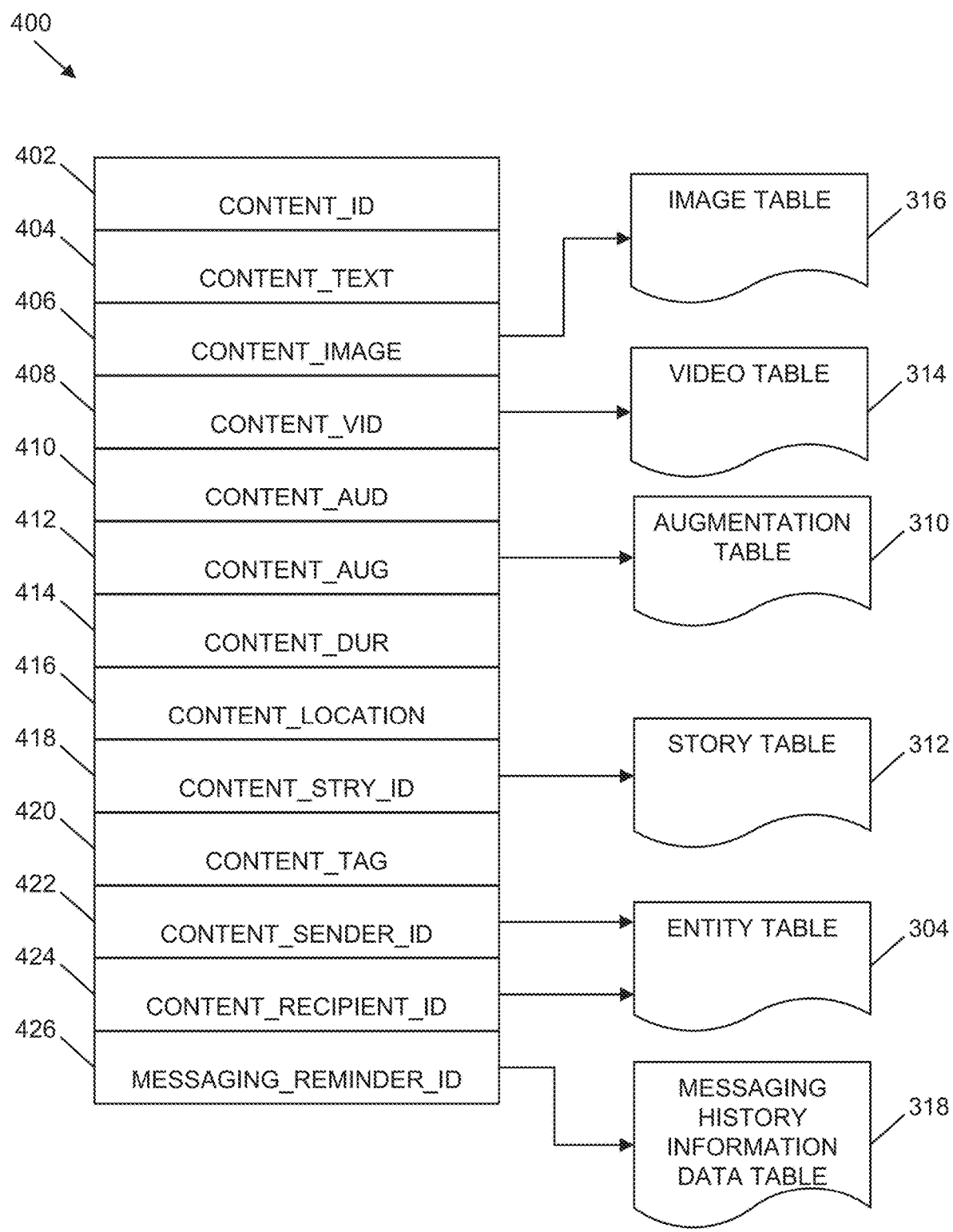
FIG. 4 is a schematic diagram illustrating an example framework for content that may be accessible via a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

messaging reminder identifier 426: an identifier of messaging reminder that may be displayed prior to a message corresponding to the content being composed.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, the messaging reminder identifier(s) 426 may point to data corresponding to a messaging reminder or a messaging session context between users of the client application stored within a data structure that includes the messaging history information data table 318.

Figure 5:
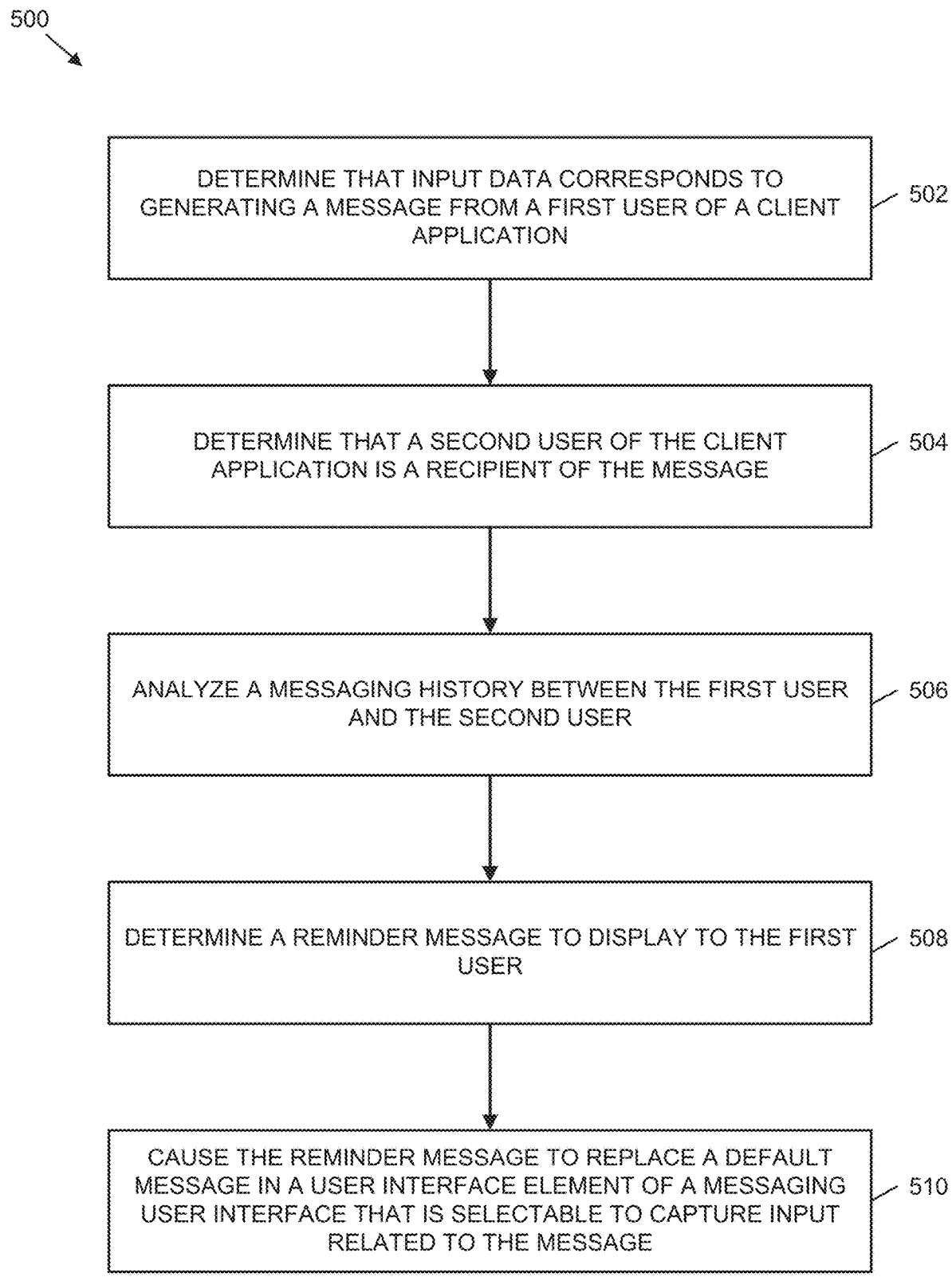
FIG. 5 is a flowchart illustrating example operations of a process to determine a reminder message to display to one or more participants in a messaging session based on a messaging history between the participants, in accordance with one or more example implementations.

FIG. 5 illustrates a flowchart of processes to provide reminder messages to one or more participants in a messaging session based on a messaging history between the participants. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIG. 5 may be deployed on various other hardware configurations. The processes described with respect to FIG. 5 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 5 is a flowchart illustrating example operations of a process 500 to determine a reminder message to display to one or more participants in a messaging session based on a messaging history between the participants, in accordance with one or more example implementations. At operation 502, the process 500 may include determining that input data corresponds to generating a message from a first user of a client application. For example, the input data may indicate launching a user interface that may capture content included in messages. In one or more additional examples, the input data may indicate that the first user has selected one or more recipients for the message.

At operation 504, the process 500 may include determining that a second user of the client application is a recipient of the message. The recipient may be determined based on input provided by the first user. To illustrate, the first user may select the second user from a list of possible recipients of the message.

The process 500, may also include, at operation 506, analyzing a messaging history between the first user and the second user. The messaging history may indicate times and dates of messages exchanged between the first user and the second user. The messaging history may also indicate content of messages exchanged between the first user and the second user. In one or more examples, analyzing the messaging history between the first user and the second user may determine a frequency of communication between the first user and the second user. Additionally, analyzing the messaging history between the first user and the second user may determine a recency of communication between the first user and the second user. Further, analyzing the messaging history between the first user and the second user may determine a tone of communications between the first user and the second user. The analysis of the messaging history between the first user and the second user may be used to determine a context for the messaging session.

In addition, at operation 508, the process 500 may include determining a reminder message to display to the first user. The reminder message may be determined based on a context of the messaging session. In one or more examples, the reminder message may be selected from among a number of reminder messages associated with the context. The context may be one of a plurality of contexts with each context being associated with one or more reminder messages. In one or more illustrative examples, a first context corresponding to a first measure of frequency of communication between the first user and the second user may be associated with a first number of reminder messages and a second context corresponding to a second measure of frequency of communication between the first user and the second user may be associated with a second number of reminder messages.

Further, the process 500 may include, at operation 510, causing the reminder message to replace a default message in a user interface element of a messaging user interface. The user interface element may be selectable to capture input related to the message. To illustrate, the user interface element may capture text, emojis, images, gifs, one or more combinations thereof, and the like that may be included in the message. In one or more illustrative examples, the default text may include "Start a Chat" or "Send a Message" and the reminder message may include "Kindness Matters" or "Compassion is Key". In this way, the reminder message may help to set a tone for the messaging session.

In one or more additional examples, a reminder message may also be displayed in a user interface element of a messaging user interface with respect to the second user after the second user receives an initial message from the first user. For example, after receiving an initial message from the first user, the message may be displayed in the messaging user interface displayed on a client device of the second user. The messaging user interface displayed on the client device of the second user may also include a user interface element that captures content related to messages. In these situations, a reminder message with respect to the second user may be determined and displayed in the user interface element before content is captured by the user interface element from the second user. In one or more examples, the reminder message provided to the second user may be based on a context of the messaging history between the first user and the second user. The reminder message may also be based on content of the message received by the second user from the first user.

In one or more further examples, the reminder message may be determined by analyzing information that may indicate a mood of the user. For example, biometric data may be analyzed to determine a mood of the user and the reminder message may be determined based on features of the biometric data. In one or more illustrative examples, at least one of body temperature, heart rate, or blood pressure may be analyzed to determine a mood of the user. In various examples, image data captured by one or more cameras of the client device may be analyzed to determine a mood of the user. In these instances, facial expressions may be analyzed to determine a mood of the user and a reminder message may be generated based on the mood of the user. In addition, audio data captured by one or more microphones of the client device may be analyzed to determine a mood of the user. In one or more examples, at least one of tone of voice or the words included in the audio content may be analyzed to determine a mood of the user. In these instances, the audio content may be used to determine one or more reminder messages. In one or more instances, a combination of biometric data, image data, and audio data may be analyzed to determine a mood of the user and the mood may then be used to determine a reminder message to display in the messaging session. At least one of the biometric data, image data, or audio data may be analyzed using at least one of one or more machine learning techniques or one or more natural language processing techniques. In one or more illustrative examples, at least one of the biometric data, image data, or audio data may be analyzed using one or more generative adversarial networks, one or more neural networks, one or more convolutional neural networks, one or more feed forward neural networks, one or more support vector machines, one or more random forests, one or more Bayesian networks, or one or more combinations thereof.

Figure 6:
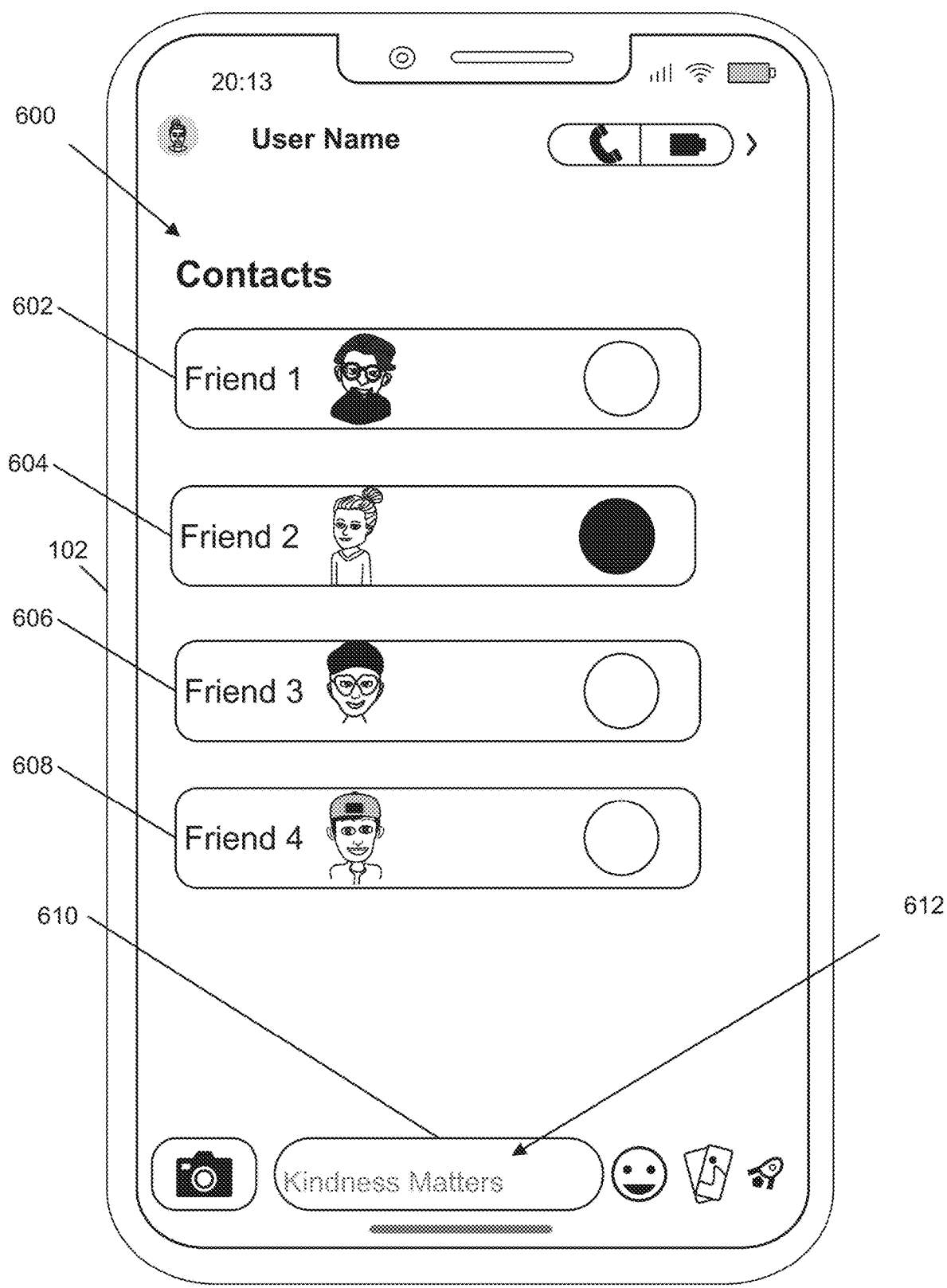
FIG. 6 is an illustration of an example user interface showing a messaging user interface with a reminder message displayed within a messaging user interface element, according to one or more example implementations.

FIG. 6 is an illustration of an example user interface 600 showing a messaging user interface with a reminder message displayed within a messaging user interface element, according to one or more example implementations. The user interface 600 may be displayed via a display device of the client device 102. In addition, the user interface 600 may be displayed by a client application, such as the client application 104, that includes at least one of messaging functionality or social networking functionality.

The user interface 600 may include a number of user interface elements 602, 604, 606, 608 that are selectable to indicate a recipient of a message. In the illustrative example of FIG. 6, the user interface element 604 has been selected. In this scenario the user of the client application that corresponds to the user interface element 604 is the recipient of the message. The user interface 600 may also include a content capture user interface element 610 that may capture content for a message to be sent to the user that corresponds to the user interface element 604. Further, a reminder message 612 may be displayed in the content capture user interface element 610 based on a messaging history between the user corresponding to the user interface element 604 and a user providing message content via the content capture user interface element 610.

Figure 7:
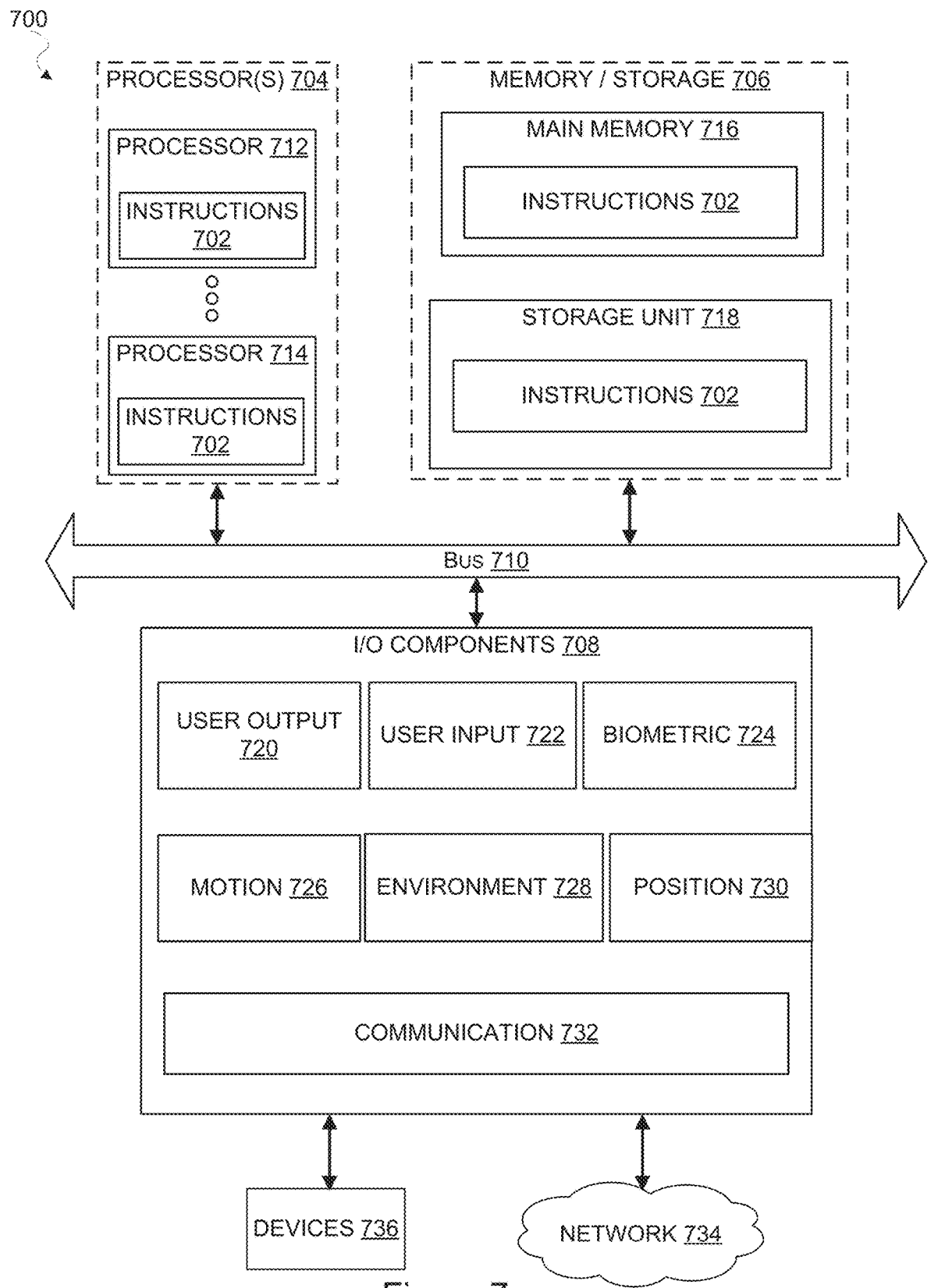
FIG. 7 is a block diagram illustrating components of a machine, in the form of a computer system, that may read and execute instructions from one or more machine-readable media to perform any one or more methodologies described herein, in accordance with one or more example implementations.

FIG. 7 is a block diagram illustrating components of a machine 700, according to some example implementations, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 702 (e.g., software, a program, an application, an applet, an app, or other executable code) for causing the machine 700 to perform any one or more of the methodologies discussed herein may be executed. As such, the instructions 702 may be used to implement modules or components described herein. The instructions 702 transform the general, non-programmed machine 700 into a particular machine 700 programmed to carry out the described and illustrated functions in the manner described. In alternative implementations, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 702, sequentially or otherwise, that specify actions to be taken by machine 700. Further, while only a single machine 700 is illustrated, the term "machine" shall also be taken to include a collection of machines that individually or jointly execute the instructions 702 to perform any one or more of the methodologies discussed herein.

The machine 700 may include processors 704, memory/storage 706, and I/O components 708, which may be configured to communicate with each other such as via a bus 710. In an example implementation, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor 712 with a single core, a single processor 712 with multiple cores (e.g., a multi-core processor), multiple processors 712, 714 with a single core, multiple processors 712, 714 with multiple cores, or any combination thereof.

The memory/storage 706 may include memory, such as a main memory 716, or other memory storage, and a storage unit 718, both accessible to the processors 704 such as via the bus 710. The storage unit 718 and main memory 716 store the instructions 702 embodying any one or more of the methodologies or functions described herein. The instructions 702 may also reside, completely or partially, within the main memory 716, within the storage unit 718, within at least one of the processors 704 (e.g., within the processor's cache memory), or any suitable combination thereof, during execution thereof by the machine 700. Accordingly, the main memory 716, the storage unit 718, and the memory of processors 704 are examples of machine-readable media.

The I/O components 708 may include a wide variety of components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various example implementations, the I/O components 708 may include user output components 720 and user input components 722. The user output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 708 may include biometric components 724, motion components 726, environmental components 728, or position components 730 among a wide array of other components. For example, the biometric components 724 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 726 may include acceleration sensor components (e.g., accelerometer), gravitation sensor components, rotation sensor components (e.g., gyroscope), and so forth. The environmental components 728 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 730 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 may include communication components 732 operable to couple the machine 700 to a network 734 or devices 736. For example, the communication components 732 may include a network interface component or other suitable device to interface with the network 734. In further examples, communication components 732 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 736 may be another machine 700 or any of a wide variety of peripheral devices (e.g., a peripheral device coupled via a USB).

Moreover, the communication components 732 may detect identifiers or include components operable to detect identifiers. For example, the communication components 732 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 732, such as location via Internet Protocol (IP) geo-location, location via Wi-Fi® signal triangulation, location via detecting an NFC beacon signal that may indicate a particular location, and so forth.

Figure 8:
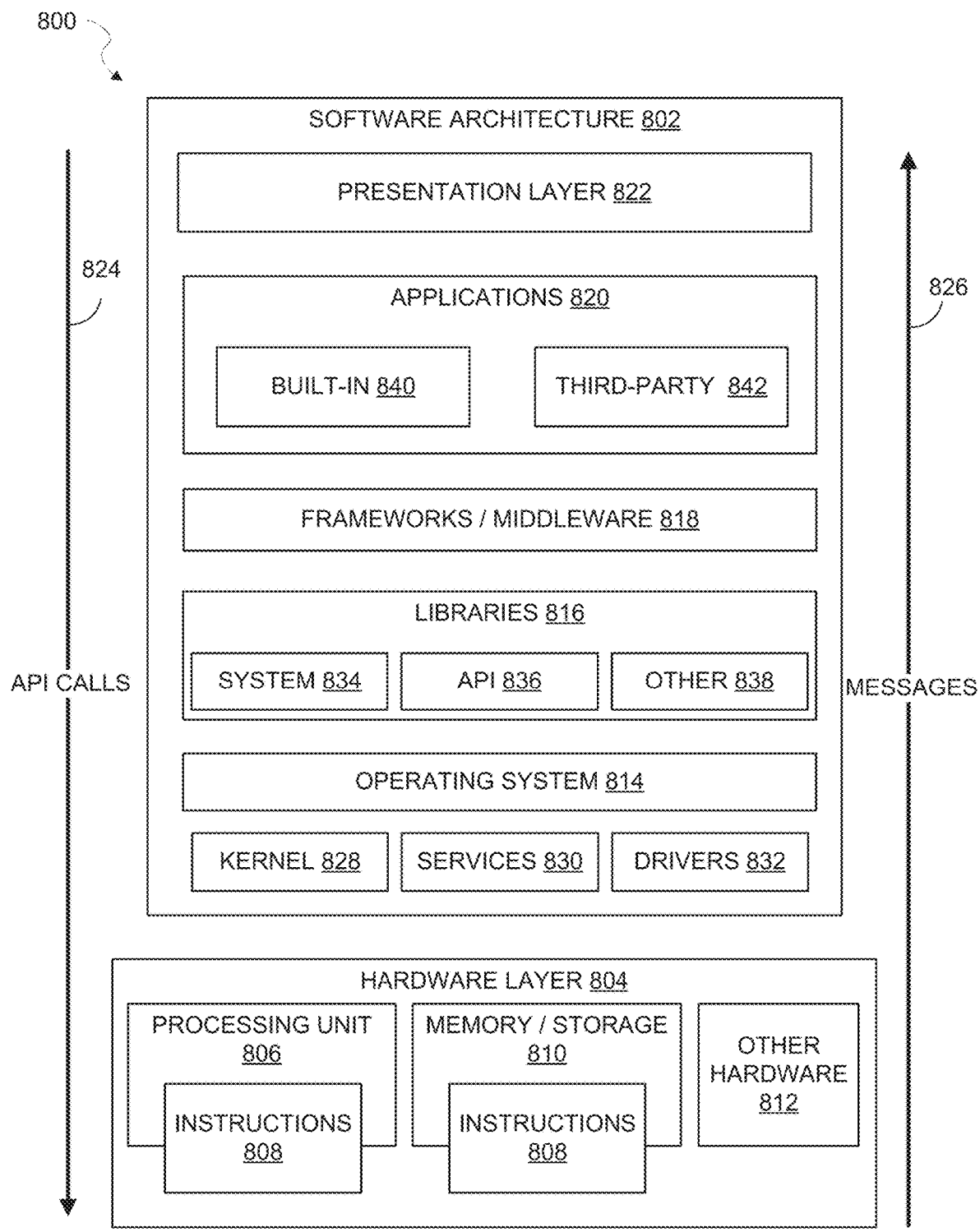
FIG. 8 is block diagram illustrating a representative software architecture that may be used in conjunction with one or more hardware architectures described herein, in accordance with one or more example implementations.

FIG. 8 is a block diagram illustrating system 800 that includes an example software architecture 802, which may be used in conjunction with various hardware architectures herein described. FIG. 8 is a non-limiting example of a software architecture and it will be appreciated that many other architectures may be implemented to facilitate the functionality described herein. The software architecture 802 may execute on hardware such as machine 700 of FIG. 7 that includes, among other things, processors 704, memory/storage 706, and input/output (I/O) components 708. A representative hardware layer 804 is illustrated and can represent, for example, the machine 700 of FIG. 7. The representative hardware layer 804 includes a processing unit 806 having associated executable instructions 808. Executable instructions 808 represent the executable instructions of the software architecture 802, including implementation of the methods, components, and so forth described herein. The hardware layer 804 also includes at least one of memory or storage modules memory/storage 810, which also have executable instructions 808. The hardware layer 804 may also comprise other hardware 812.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 822. Operationally, the applications 820 or other components within the layers may invoke API calls 824 through the software stack and receive messages 826 in response to the API calls 824. The layers illustrated are representative in nature and not all software architectures have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 are responsible for controlling or interfacing with the underlying hardware. For instance, the drivers 832 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 provide a common infrastructure that is used by at least one of the applications 820, other components, or layers. The libraries 816 provide functionality that allows other software components to perform tasks in an easier fashion than to interface directly with the underlying operating system 814 functionality (e.g., kernel 828, services 830, drivers 832). The libraries 816 may include system libraries 834 (e.g., C standard library) that may provide functions such as memory allocation functions, string manipulation functions, mathematical functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) provide a higher-level common infrastructure that may be used by the applications 820 or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 820 or other software components/modules, some of which may be specific to a particular operating system 814 or platform.

The applications 820 include built-in applications 840 and third-party applications 842. Examples of representative built-in applications 840 may include, but are not limited to, a contacts application, a browser application, a book reader application, a location application, a media application, a messaging application, or a game application. Third-party applications 842 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 842 may invoke the API calls 824 provided by the mobile operating system (such as operating system 814) to facilitate functionality described herein.

The applications 820 may use built-in operating system functions (e.g., kernel 828, services 830, drivers 832), libraries 816, and frameworks/middleware 818 to create UIs to interact with users of the system. Alternatively, or additionally, in some systems, interactions with a user may occur through a presentation layer, such as presentation layer 822. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 702 for execution by the machine 700, and includes digital or analog communications signals or other intangible medium to facilitate communication of such instructions 702. Instructions 702 may be transmitted or received over the network 110, 734 using a transitory or non-transitory transmission medium via a network interface device and using any one of a number of well-known transfer protocols.

"CLIENT DEVICE," in this context, refers to any machine 700 that interfaces to a communications network 110, 734 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 734.

"COMMUNICATIONS NETWORK," in this context, refers to one or more portions of a network 110, 734 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 734 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 702 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 702. The term "machine-readable medium" shall also be taken to include any medium, or combination of multiple media, that is capable of storing instructions 702 (e.g., code) for execution by a machine 700, such that the instructions 702, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 704 or other programmable processor. Once configured by such software, hardware components become specific machines (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor 712, 714 or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 712, 714 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 110 (e.g., the Internet) and via one or more appropriate interfaces (e.g., an API). The performance of certain of the operations may be distributed among the processors, not only residing within a single machine 700, but deployed across a number of machines. In some example implementations, the processors 704 or processor-implemented components may be located in a single geographic location (e.g., within a home environment, an office environment, or a server farm). In other example implementations, the processors 704 or processor-implemented components may be distributed across a number of geographic locations.

"PROCESSOR," in this context, refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may, for example, be a CPU, a RISC processor, a CISC processor, a GPU, a DSP, an ASIC, a RFIC or any combination thereof. A processor 704 may further be a multi-core processor having two or more independent processors 704 (sometimes referred to as "cores") that may execute instructions 702 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:

causing, by one or more computing devices having one or more processors and memory, a messaging user interface to be displayed that includes a first plurality of user interface elements that correspond to a plurality of contacts of a first user of a client application and a second user interface element that is selectable to capture input related to messages of a messaging session between the first user and a second user, wherein a default message is displayed in the second user interface element;

determining, by at least one computing device of the one or more computing devices, that a user interface element of the first plurality of user interface elements has been selected to indicate that a contact of the plurality of contacts is a recipient of a message from the first user;

determining, by at least one computing device of the one or more computing devices, that the recipient is included in an entity table of the first user, the entity table indicating that the recipient has a relationship with the first user in relation to the client application, wherein the recipient is a second user of the client application;

analyzing, by at least one computing device of the one or more computing devices, a messaging history between the first user and the second user;

determining, by at least one computing device of the one or more computing devices, a reminder message to display to the first user;

responsive to selection of the user interface element, causing, by at least one computing device of the one or more computing devices, the reminder message to replace the default message in the second user interface element to generate a modified version of the messaging user interface that concurrently displays the first plurality of user interface elements and the reminder message in the second user interface element;

capturing, by at least one computing device of the one or more computing devices, message content in the second user interface element, the message content excluding the reminder message;

generating, by at least one computing device of the one or more computing devices, the message for the recipient that includes the message content; and causing, by at least one computing device of the one or more computing devices, the message to be sent to the recipient.

2. The method of claim 1, further comprising:
determining, by at least one computing device of the one or more computing devices, one or more characteristics of the messaging history between the first user and the second user;
analyzing, by at least one computing device of the one or more computing devices, the one or more characteristics of the messaging history with respect to one or more criteria that correspond to a plurality of contexts;
determining, by at least one computing device of the one or more computing devices, individual measures of similarity between the one or more characteristics of the messaging history and the one or more criteria for individual contexts of the plurality of contexts;
determining, by at least one computing device of the one or more computing devices, a context of the messaging session between the first user and the second user based on the individual measures of similarity; and
selecting, by at least one computing device of the one or more computing devices, the reminder message from a plurality of reminder messages that correspond to the context.

3. The method of claim 1, wherein capturing the message content in the second user interface element includes:
determining, by at least one computing device of the one or more computing devices, that the message content includes at least one of image content or video content has been captured via the client application; and
applying, by at least one computing device of the one or more computing devices, augmented reality content to the message content, wherein the message content includes the at least one of image content or video content transformed by the augmented reality content.

4. The method of claim 1, wherein the reminder message is a first reminder message displayed during the messaging session in accordance with a first context of the messaging session, and the method comprises:
determining, by at least one computing device of the one or more computing devices, a second reminder message that corresponds to a second context of the messaging session; and
causing, by at least one computing device of the one or more computing devices, the second reminder message to be displayed in the second user interface element.

5. The method of claim 1, wherein:
analyzing the messaging history between the first user and the second user includes:
analyzing, by at least one computing device of the one or more computing devices, content of one or more messaging sessions between the first user and the second user;
the method further comprises determining, by at least one computing device of the one or more computing devices, a tone of the one or more messaging sessions; and
the reminder message is determined based on the tone of the one or more messaging sessions.

6. The method of claim 1, comprising:
obtaining by at least one computing device of the one or more computing devices, biometric data from one or more biometric sensors of a client device;
analyzing, by at least one computing device of the one or more computing devices, the biometric data to determine a mood of the first user; and
generating, by at least one computing device of the one or more computing devices, the reminder message or one or more additional reminder messages based on the mood of the first user.

7. The method of claim 1, comprising:
obtaining by at least one computing device of the one or more computing devices, image data from one or more cameras of a client device;
analyzing, by at least one computing device of the one or more computing devices, the image data to determine a mood of the first user; and
generating, by at least one computing device of the one or more computing devices, the reminder message or one or more additional reminder messages based on the mood of the first user.

8. The method of claim 1, comprising:
obtaining by at least one computing device of the one or more computing devices, audio data from one or more microphones of a client device;
analyzing, by at least one computing device of the one or more computing devices, the audio data to determine a mood of the first user; and
generating, by at least one computing device of the one or more computing devices, the reminder message or one or more additional reminder messages based on the mood of the first user.

9. A system comprising:
one or more hardware processors; and
one or more non-transitory computer-readable storage media including computer-readable instructions that, when executed by the one or more hardware processors, cause the one or more hardware processors to perform operations comprising:
causing a messaging user interface to be displayed that includes a first plurality of user interface elements that correspond to a plurality of contacts of a first user of a client application and a second user interface element that is selectable to capture input related to messages of a messaging session between the first user and a second user, wherein a default message is displayed in the second user interface element;
determining that a user interface element of the first plurality of user interface elements has been selected to indicate that a contact of the plurality of contacts is a recipient of a message from the first user;
determining that the recipient is included in an entity table of the first user, the entity table indicating that the recipient has a relationship with the first user in relation to the client application, wherein the recipient is a second user of the client application;
analyzing a messaging history between the first user and the second user;
determining a reminder message to display to the first user;
responsive to selection of the user interface element, causing the reminder message to replace the default message in the second user interface element to generate a modified version of the messaging user interface that concurrently displays the first plurality of user interface elements and the reminder message in the second user interface element;
capturing message content in the second user interface element, the message content excluding the reminder message;
generating the message for the recipient that includes the message content; and
causing the message to be sent to the recipient.

10. The system of claim 9, wherein the one or more non-transitory computer-readable storage media include additional computer-readable instructions that, when executed by the one or more hardware processors, cause the one or more hardware processors to perform additional operations comprising:

determining a context of the messaging session between the first user and the second user; and selecting the reminder message from a plurality of reminder messages that correspond to the context.

11. The system of claim 9, wherein the one or more non-transitory computer-readable storage media include additional computer-readable instructions that, when executed by the one or more hardware processors, cause the one or more hardware processors to perform additional operations comprising:

analyzing content of the message;

determining a context of the messaging history between the first user and the second user;

determining an additional reminder message from a plurality of reminder messages based on the context of the messaging history between the first user and the second user; and causing the additional reminder message to replace the default message in an additional user interface element of the messaging user interface that is displayed within an instance of the client application executed by a client device of the second user.

12. The system of claim 11, wherein the context is one of a plurality of contexts that correspond to messaging histories of users of the client application, individual contexts of the plurality of contexts being associated with a respective set of reminders.

13. The system of claim 9, wherein:

analyzing the messaging history between the first user and the second user includes: analyzing content of one or more messaging sessions between the first user and the second user;

the one or more non-transitory computer-readable storage media include additional computer-readable instructions that, when executed by the one or more hardware processors, cause the one or more hardware processors to perform additional operations comprising:

determining a tone of the one or more messaging sessions; and the reminder message is determined based on the tone of the one or more messaging sessions.

14. The system of claim 9, wherein the one or more non-transitory computer-readable storage media include additional computer-readable instructions that, when executed by the one or more hardware processors, cause the one or more hardware processors to perform additional operations comprising:

obtaining biometric data from one or more biometric sensors of a computing device, image data from one or more cameras of a client device, and audio data from one or more microphones of the client device;

analyzing the biometric data, the image data, and the audio data to determine a mood of the first user; and generating the reminder message or one or more additional reminder messages based on the mood of the first user.

15. One or more non-transitory computer-readable storage media including instructions that when executed by one or more processors, cause the one or more processors to perform operations comprising:

causing a messaging user interface to be displayed that includes a first plurality of user interface elements that correspond to a plurality of contacts of a first user of a client application and a second user interface element that is selectable to capture input related to messages of a messaging session between the first user and a second user, wherein a default message is displayed in the second user interface element;

determining that a user interface element of the first plurality of user interface elements has been selected to indicate that a contact of the plurality of contacts is a recipient of a message from the first user;

determining that the recipient is included in an entity table of the first user, the entity table indicating that the recipient has a relationship with the first user in relation to the client application, wherein the recipient is a second user of the client application;

analyzing a messaging history between the first user and the second user;

determining a reminder message to display to the first user;

responsive to selection of the user interface element, causing the reminder message to replace the default message in the second user interface element to generate a modified version of the messaging user interface that concurrently displays the first plurality of user interface elements and the reminder message in the second user interface element;

capturing message content in the second user interface element, the message content excluding the reminder message;

generating the message for the recipient that includes the message content; and causing the message to be sent to the recipient.

16. The one or more non-transitory computer-readable storage media of claim 15, including additional instructions that when executed by one or more processors, cause the one or more processors to perform additional operations comprising:

determining a context of the messaging session between the first user and the second user; and selecting the reminder message from a plurality of reminder messages that correspond to the context.

17. The one or more non-transitory computer-readable storage media of claim 16, wherein the context is one of a plurality of contexts that correspond to messaging histories of users of the client application, individual contexts of the plurality of contexts being associated with a respective set of reminders.

18. The one or more non-transitory computer-readable storage media of claim 15, wherein the one or more non-transitory computer-readable storage media include additional computer-readable instructions that, when executed by the one or more processors, cause the one or more processors to perform additional operations comprising:

analyzing the message content;

determining, based on the message content and the messaging history between the first user and the second user, an additional reminder message; and causing the additional reminder message to be displayed in an additional user interface element of an additional messaging user interface of the recipient of the message, the additional user interface element being configured to capture additional content related to additional messages of the recipient and to display the additional reminder message before the additional content is captured by the additional user interface element.

19. The one or more non-transitory computer-readable storage media of claim 15, wherein:
   analyzing the messaging history between the first user and the second user includes: analyzing content of one or more messaging sessions between the first user and the second user;
   the one or more non-transitory computer-readable storage media include additional computer-readable instructions that, when executed by the one or more processors, cause the one or more processors to perform additional operations comprising:
   determining a tone of the one or more messaging sessions; and
   the reminder message is determined based on the tone of the one or more messaging sessions.

20. The one or more non-transitory computer-readable storage media of claim 15, including additional instructions that when executed by one or more processors, cause the one or more processors to perform additional operations comprising:
   obtaining biometric data from one or more biometric sensors of a computing device, image data from one or more cameras of a client device, and audio data from one or more microphones of the client device;
   analyzing the biometric data, the image data, and the audio data to determine a mood of the first user; and
   generating the reminder message or one or more additional reminder messages based on the mood of the first user.

* * * * *